United States Patent
Perkinson

(10) Patent No.: US 8,402,120 B1
(45) Date of Patent: Mar. 19, 2013

(54) SYSTEM AND METHOD FOR LOCATING AND CONFIGURING NETWORK DEVICE

(75) Inventor: David Perkinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 196 days.

(21) Appl. No.: 12/939,200

(22) Filed: Nov. 4, 2010

(51) Int. Cl.
*G06F 15/177* (2006.01)

(52) U.S. Cl. .................. 709/221; 370/254; 370/351

(58) Field of Classification Search ............... None
See application file for complete search history.

(56) References Cited

U.S. PATENT DOCUMENTS

| | | | |
|---|---|---|---|
| 5,694,541 A | 12/1997 | Service et al. | 395/183.22 |
| 7,554,959 B1 | 6/2009 | Dowling | 370/338 |
| 7,873,057 B2 * | 1/2011 | Robitaille et al. | 370/401 |
| 8,046,450 B1 * | 10/2011 | Schloss et al. | 709/223 |
| 2003/0061320 A1 * | 3/2003 | Grover et al. | 709/222 |
| 2005/0122958 A1 | 6/2005 | Shim et al. | 370/352 |
| 2005/0223111 A1 * | 10/2005 | Bhandaru et al. | 709/236 |
| 2006/0242271 A1 | 10/2006 | Tucker et al. | 709/220 |
| 2007/0255832 A1 * | 11/2007 | Riesberg et al. | 709/226 |
| 2008/0059623 A1 * | 3/2008 | Yang et al. | 709/223 |
| 2008/0089244 A1 * | 4/2008 | Yu | 370/255 |
| 2008/0211906 A1 | 9/2008 | Lovric | 348/143 |
| 2009/0070441 A1 * | 3/2009 | Karlov et al. | 709/220 |
| 2009/0177782 A1 * | 7/2009 | Blatherwick et al. | 709/228 |

\* cited by examiner

*Primary Examiner* — Moustafa M Meky
*Assistant Examiner* — Clayton R Williams
(74) *Attorney, Agent, or Firm* — Allen, Dyer, Doppelt, Milbrath & Gilchrist, P.A.

(57) ABSTRACT

In accordance with a non-limiting example, a communications method and system locates a network device that has been misconfigured by propagating within the same broadcast domain of an Ethernet communications network to which the network device is connected a discovery protocol frame and determining the Media Access Control (MAC) address of the remote device. A remote console terminal is connected for communications to the Ethernet communications network to the network device after discovering the network device. The remote console terminal communicates with the network device using Ethernet packets and configures correctly the network device such as by configuring a correct internet protocol (IP) address of the remote device.

14 Claims, 5 Drawing Sheets

LLDP ORGANIZATIONALLY-SPECIFIC TLV
THIS TLV IS DEFINED SO THAT AN ORGANIZATION CAN EXTEND LLDP TO FIT THEIR NEEDS. THE OUI (ORGANIZATIONALLY UNIQUE IDENTIFIER) IS INCLUDED SO THAT EACH ORGANIZATION CAN DIFFERENTIATE BETWEEN THEIR OWN SPECIAL TLVS AND OTHER ORGANIZATION'S TLVS.

| TLV TYPE =127 | TLV INFORMATION STRING LENGTH | OUI | ORGANIZATIONALLY-DEFINED SUBTYPE | ORGANIZATIONALLY-DEFINED INFORMATION STRING |
|---|---|---|---|---|
| ←--7 BITS--→ | ←------9 BITS------→ | ←-3 OCTETS-→ | ←---1 OCTET---→ | ←--0 TO 507 OCTETS--→ |

FIG. 4A

DEFINE QUERY TO OBTAIN PHYSICAL NETWORK CONNECTIVITY DATA, INCLUDING MAC ADDRESS TO LOCATE MISCONFIGURED NETWORK DEVICE

MAC ADDRESS TLV

| TLV TYPE =127 | TLV INFORMATION STRING LENGTH | OUI 0x00 0xA0 0xC8 | TLV SUBTYPE 0x05 | MAC ADDRESS | ACTION |
|---|---|---|---|---|---|

FIG. 4B

SYSTEM AND METHOD FOR LOCATING AND CONFIGURING NETWORK DEVICE

FIELD OF THE INVENTION

This invention relates to communications systems, and more particularly, this invention relates to locating and configuring network devices that have been misconfigured.

BACKGROUND OF THE INVENTION

Remote devices that are connected as part of an Ethernet network, for example, could possibly be misconfigured, such as with an incorrect IP address. As a result, the misconfigured remote device cannot be reached over the network and an administrator typically must drive to the remote location and plug-in a serial cable to the remote device and fix the configuration. This is known as the dreaded truck roll. Some known solutions allow a user or other repair technician to connect a modem to a serial cable at the device and use a separate network to make the configuration change. For example, the cellular radio network often is used in these instances to establish a connection and make any necessary configuration changes.

Although network devices can be misconfigured for a variety of reasons, configuring the wrong IP address in the network device is the most common error. In a typical situation confronted by an equipment supplier, a device such as a Multi-Service Access and Aggregation Platform (MSAP) could be located at a central office and connected to a remote gateway device or router as part of the same broadcast domain. An example of the MSAP is the TA5000 from ADTRAN, INC. and an example of the gateway device is a TA900 series device by ADTRAN, INC. The connection exists between the two devices along the same "wire." The TA900 may be configured correctly in this example except perhaps for the IP address. The configuration may be close, but it is not accurate in all aspects and needs to be corrected. A frustrating thing for the network administrator is that communication with the device is possible, but the misconfiguration of the remote device is problematic.

A real-life example concerns an installer that has several TA900's as routers or gateway devices to install in one day at different locations. The installer quickly installs the devices in a busy day, but does not test them, or believes the installation of each is acceptable, but perhaps he has swapped two of them accidentally. The devices are configured correctly except for their IP addresses because of the swap. It is not feasible for the installer to drive back to the remote locations and configure IP addresses. It is desirable to configure the misconfigured TA900 (or similar remote device) without having to drive to the remote location in the dreaded truck roll, plug in a serial cable, and fix the configuration.

SUMMARY OF THE INVENTION

In accordance with a non-limiting example, a communications method and system locates a network device that has been misconfigured by propagating within the same broadcast domain of an Ethernet communications network to which the network device is connected a discovery protocol frame and determining the Media Access Control (MAC) address of the remote device. A remote console terminal is connected for communications through the Ethernet communications network to the network device after discovering the network device. The remote console terminal communicates with the network device using Ethernet packets and configures correctly the network device such as by configuring a correct internet protocol (IP) address of the remote device.

In one example, the discovery protocol frame is formed as a one-way neighbor discovery protocol frame. Examples could include a Link Layer Discovery Protocol (LLDP) or a link layer Ethernet OAM message. The system and method accesses at a network switch in another example a Management Information Base (MIB) via the Simple Network Management Protocol (SNMP) to determine a MAC address and physical conductivity date for the network device that has been misconfigured in order to establish communications between the remote console terminal and network device.

In another example, it is possible to send Ethernet packets using a clear text protocol and also transmit Ethernet packets using an encrypted protocol. The discovery protocol frame in an example includes a field having a user defined field as a command that indicates information should be given by the remote device as to the MAC address.

BRIEF DESCRIPTION OF THE DRAWINGS

Other objects, features and advantages of the present invention will become apparent from the detailed description of the invention which follows, when considered in light of the accompanying drawings in which:

FIG. 4A is a diagram showing an example for frame format for a Link Layer Discovery Protocol (LLDP) organizationally specific TLV that could be modified and used in accordance with a non-limiting example.

FIG. 4B is a diagram showing an example frame format for a MAC address TLV that could be modified and used in accordance with a non-limiting example.

DETAILED DESCRIPTION

Figure 1:
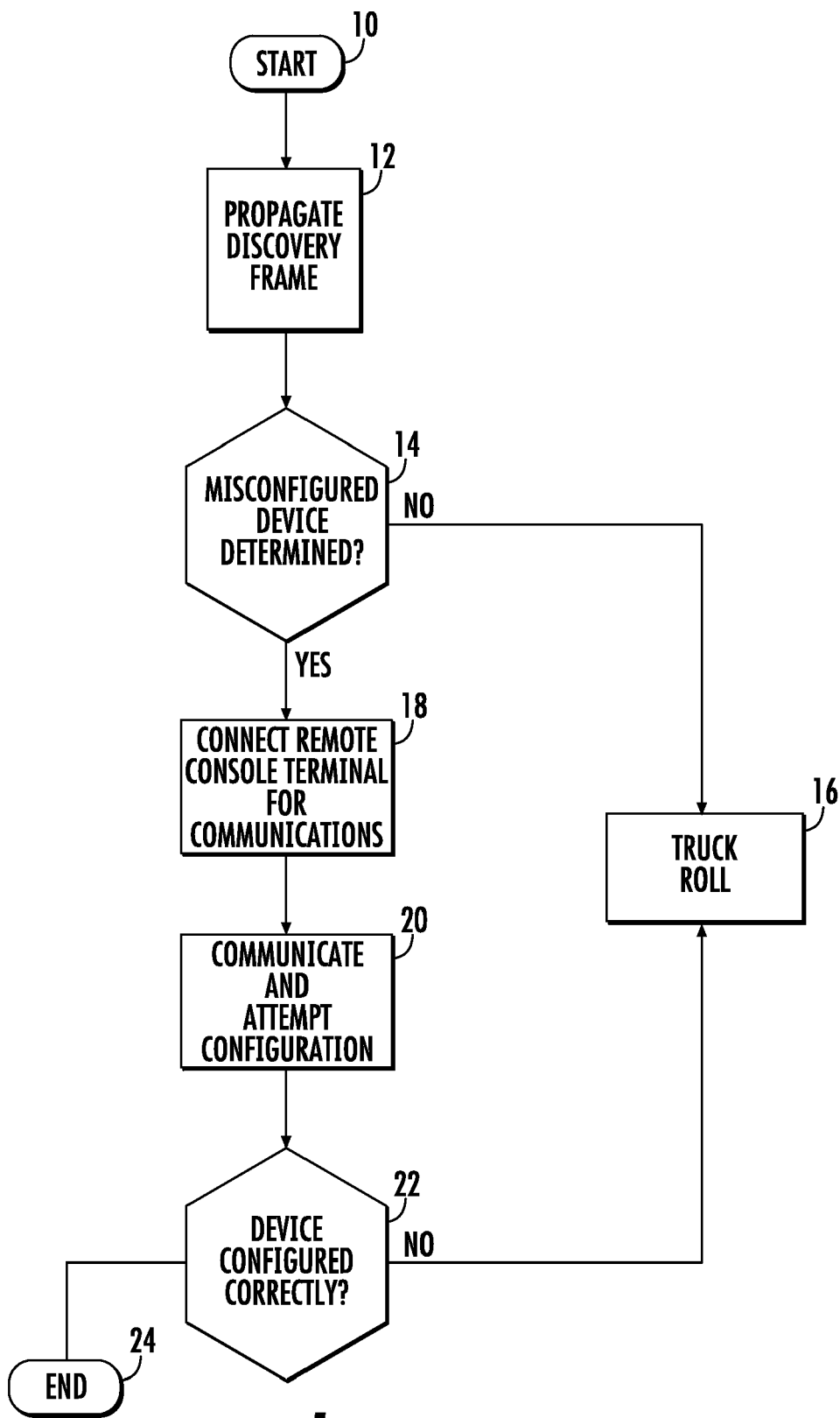
FIG. 1 is a high-level flowchart of an example method that can be used in accordance with a non-limiting example for locating and configuring a remote device that had been misconfigured.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

This technical problem as addressed above is solved in one example by discovering or locating the misconfigured network device in a first step, for example, by propagating over the Ethernet communications network to which the network device is connected a discovery protocol frame using a one-way discovery protocol, e.g., LLDP, and determining the Media Access Control (MAC) address of the misconfigured network device. Other discovery protocols could be used, for example, possibly using link layer OAM messages. A remote console terminal is connected to communicate through the Ethernet communications network to the misconfigured network device after the misconfigured network device is discovered. The remote console terminal communicates with the misconfigured network device using the Ethernet packets and configures correctly the network device through appropriate instructions without the dreaded truck roll.

The system uses in an example a console terminal over Ethernet. This console terminal works (to the user) similar to a serial terminal, except that this console terminal uses packet communications over Ethernet, and not serial or IP. In this example, the user logs into a multi-service access and aggregation platform (MSAP) such as a TA5000 and consoles to the attached network device that is misconfigured. An example as noted above is the TA900 network device connected to the TA5000, both manufactured by ADTRAN, INC. The system sees the misconfigured network device as an LLDP neighbor, but the user still cannot configure it because in this example somehow the wrong TA900 was installed. In a non-limiting example, from the TA5000 command prompt, the user would type:

```
TA5000#   console gig 1/2
Username:    adtran
Password:    adtran
TA900> enable
Password:    adtran
TA900# show start
```

As an alternative, it is also possible to use the destination MAC address that had been located in this process:
TA5000# console gig 1/2 00:a0:c8:01:02:03

The communications protocol used over Ethernet could be clear text or encrypted. This is advantageous when the WAN transport is Ethernet. This methodology could also be used in other cases, but it would typically work advantageously when the Layer 2 WAN set up is correct. The command prompts and passwords identified above are only representative examples using the described devices in accordance with this non-limiting example. Both devices, in this example the TA5000 and the TA900, use the same network interface and operating system, such as the ADTRAN operating system (AOS). This operating system includes a web interface that can be used to configure, troubleshoot and view statistics about an AOS device. A command line interface can be used to enable and configure access to the web interface. Different ports, including a console port, could be used in a non-limiting example.

Because the MAC address is known from using the discovery protocol, the MSAP in this example can communicate successfully with the misconfigured network device. This is advantageous for smaller businesses that probably would not want to pay for an out-of-band management channel that burns another wire or radio bandwidth. This system and method would not solve all possible problems that may arise in this type of situation, but it could save a number of truck rolls a year, acting as an improvement and benefit to customers.

It should be understood that the system uses packet communications over Ethernet and not the serial or IP, such as Telnet, which is common when using a personal computer. The system and method as described is typically limited technically to the broadcast domain and the particular connection wire. The fiber has been plugged in, and thus, it is possible to see the device as an LLDP neighbor and later configure it using the packet communications over Ethernet. The LLDP as a non-limiting example would inform the system such as a network manager, which could be part of the remote console terminal, that there is a misconfigured network device, e.g., the TA900 on the other end of the wire, and inform of its MAC address.

A user logs-in over the Ethernet such as in the example shown above. The console gig 1/2 command is a non-limiting example using the described device and informs the system that the user desires to console out to the peer, i.e., to the MAC address, based upon the card or port determined through LLDP discovery. The system knows the wire to which the misconfigured device, e.g., the TA900 in this example is connected, and logs in to make the desired console session to the destination MAC address of the misconfigured network device. Instead of encapsulating the console session over TCPIP as in a Telnet session, it is "wrapped up" (i.e., encapsulated in Ethernet packets) and exchanged in the communications session over the Ethernet network. The misconfigured network device, as the TA900 in this example, is enabled after logging in and various passwords are given. Once logged in, the user changes the configuration and could even later Telnet. Another alternative is to insert the MAC address directly as shown by the example above. This system and method as described is advantageous because Ethernet is beginning to dominate WAN conductivity.

FIG. 1 is a high-level flowchart of an example method that can be used in accordance with a non-limiting example for locating and configuring the misconfigured network device. The process starts (block 10). The discovery protocol frame is propagated through the Ethernet communications network to which the misconfigured network device is connected to locate the network device by determining the Media Access Control (MAC) address of the remote device (block 12). A determination is made whether the device is identified and located (block 14), and if not, then the misconfigured network device cannot be configured from the remote console termination, and a truck roll must occur (block 16). If the device has been identified and located, then the remote console terminal is connected for communications through the Ethernet communications network to the network device (block 18). The remote console terminal communicates with the network device using Ethernet packets, including transmitting instructions or other data to configure correctly the misconfigured network device (block 20). A determination is made if the device has been configured (block 22), and if not, then the truck roll must occur (block 16). If yes, then the process ends (block 24).

Figure 2:
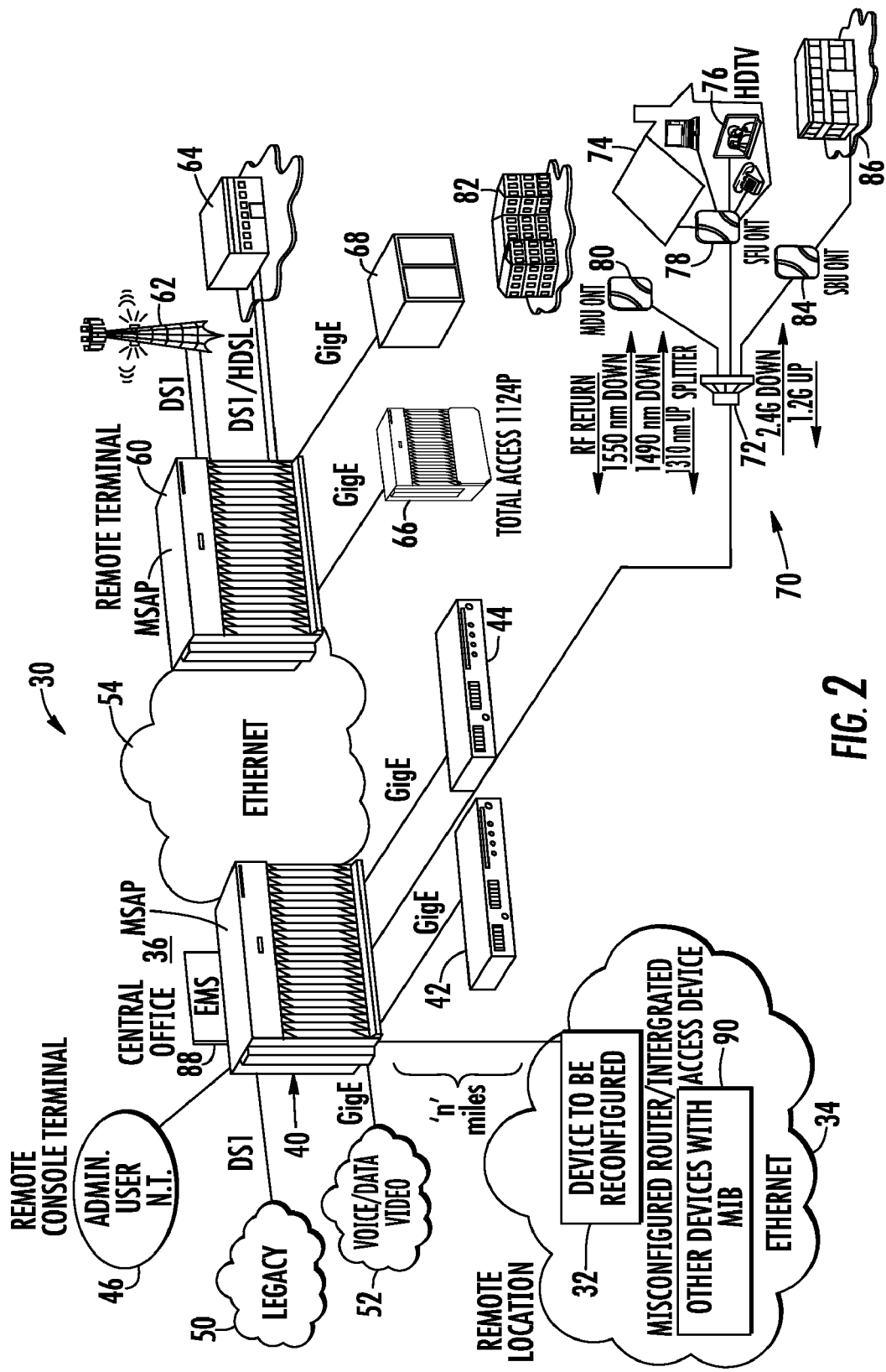
FIG. 2 is a high-level block diagram of a communications system showing various network devices in which a remote console terminal configures correctly the network device using the method described relative to FIG. 1 and in accordance with a non-limiting example.

FIG. 2 is a high-level block diagram of a communications system 30 showing a plurality of network elements, for example, various network switches, routers and MSAP components that form the communications system or network.

This system example is illustrated to show an example of a network that includes a misconfigured network device 32 to be located such as the gateway device or router as a TA900 in this example to be reconfigured and shown connected as part of the Ethernet communications system 34. The central office 36 includes a MSAP 38, for example, a Total Access 5000 40, and also is connected by gigabit Ethernet connection network to various gateway or router devices 42,44, such as a Total Access 1248V and Total Access 1248A. An administrative user 46 as a network manager or other user for the remote console terminal in this example can log-on to the misconfigured network device 32 using the methodology indicated above. The MSAP 40 also connects via a legacy DS1 connection to a legacy network 50 and voice/data and video network 52 in this example, such as with gigabit Ethernet. The Ethernet network 54 allows a connection to another MSAP 60 as a remote terminal that connects to various components such as a tower 62 through DS1 and another communications facility 64 through DS1/HDSL in this example. The remote console terminal 46 also connects to an outside plant (OSP) broadband multimode gateway 66 Total Access 1124P and other network device 68 in this non-limiting example. The central office 36 through the MSAP 40 also connects to a Passive Optical Network (PON) 70 that incorporates various components that can be used in accordance with a non-limiting example. In this example, the MSAP 40 connects via a splitter 72 to a home premises 74, which includes a HDTV 76 as an example and other home devices that connect through a single family unit (SFU) optical network unit 78.

The MSAP 40 connects also into an MDU ONT 80 for a multi-dwelling unit 82 and a SBU ONT 84 for small/medium business 86. The MSAP in the central office in this non-limiting example could include a number of Gigabit Passive Optical Network (GPON) OLT (optical line termination) access modules and use GPON encapsulation mode (GEM), which carry Ethernet traffic between the OLT and the ONU. An Optical Distribution Network (ODN) is typically located between the OLT and ONU. Typically the ODN includes fibers and passive splitters as illustrated for allowing fiber to the premises (FTTP).

The SFU ONU 78 is typically a unit mounted on the side of a home with a box-in-box, weatherproof, and access control construction. Typically, SFF transceivers, which are soldered to an ONU board, are used for the ONU. The Full Services Access Network (FSAN) ITU G.983.3 and G.984.2 standards can be used to define the optical characteristics of a PON with three wavelengths: 1490 and 1310 nm for data and 1550 nm to support RF broadcast video. Burst-mode receiver electronics in the OLT transceiver enable a single transceiver in the central office to communicate with transceivers in the plurality of optical network units on the same PON through the use of "time slots" and Time-Division Multiple Access (TDMA) techniques.

It should be understood that the MSAP 40 as illustrated as an example TA5000 device optimizes existing network infrastructure to support advanced services, including IPTV, broadband connection to the Internet, and Ethernet. This MSAP 40 supports broadband service delivery over both copper and fiber architectures, and provides flexible copper and fiber aggregation solutions. Legacy services include TDM, PPP, frame relay and ATM and GPON, XDSL and Ethernet are provided. The MSAP accomplishes these different services with aggregation, allowing deployment of an advanced packet network infrastructure that can deliver different services including POTS, DSL, PON and Ethernet across a pure Ethernet core. The MSAP is also operable with an Element Management System (EMS) 88 to provide a common management application such as provided by ADTRAN, INC. of Huntsville, Ala. The misconfigured network device 32 in one example is an integrated access device such as the TA900 series device that can provide incumbent local exchange carriers, competitive local exchange carriers and internet service providers an effective IP network strategy for VoIP deployment. The device operates in one example as a router or IP business gateway, including carrier Ethernet in this example and SIP/MGCP voice over IP networks. The ADTRAN operating system (AOS) can be used.

Figure 5:
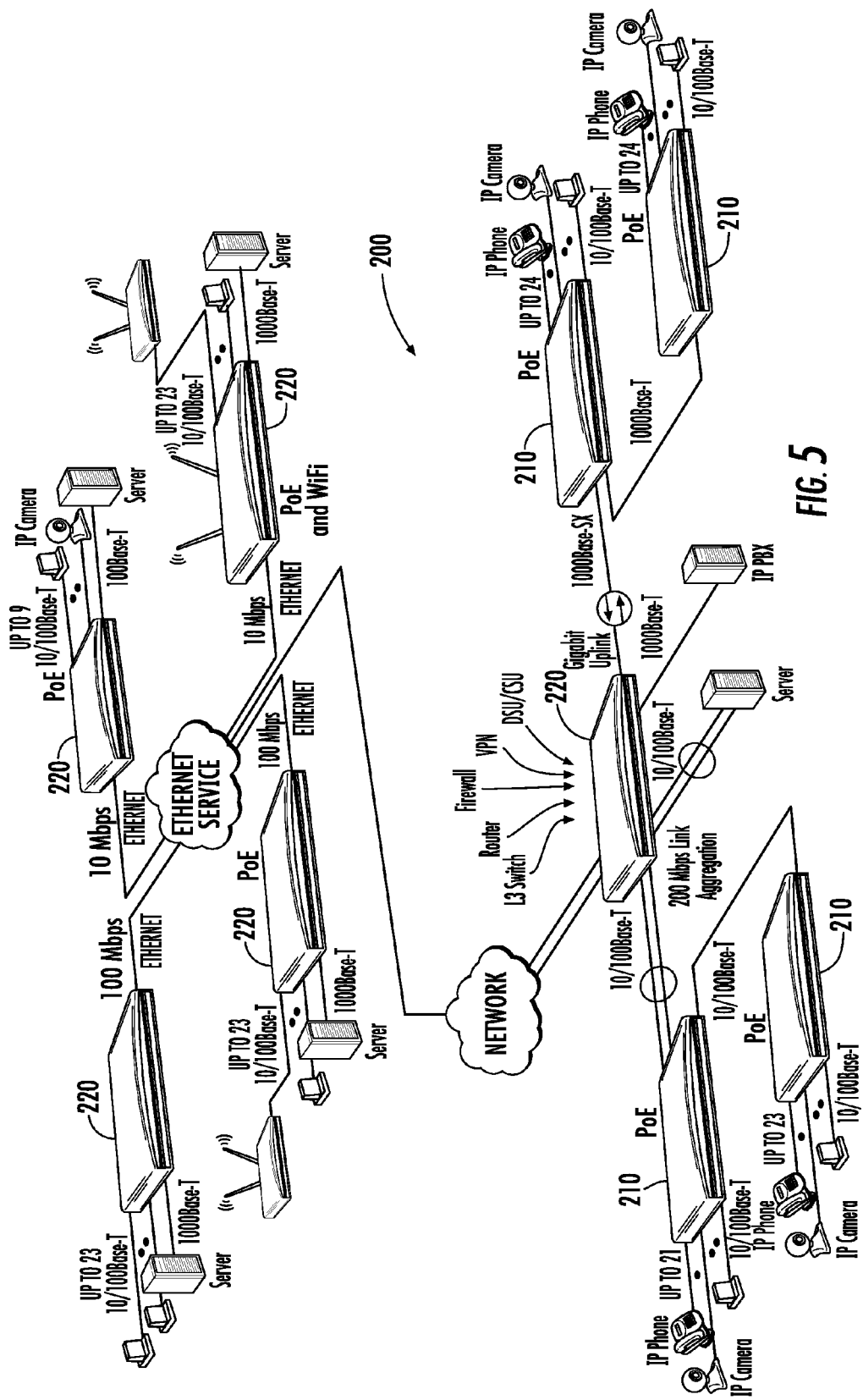
FIG. 5 is an example of a communication system that could incorporate the method as described and showing various components and the methodology and use frame formats as shown in FIGS. 3A-3C and FIGS. 4A and 4B in accordance with a non-limiting example for locating the network device that has been misconfigured.

An LLDP frame that can be used as an example is illustrated in FIGS. 3A-3C and 4A and 4B. It should be understood that this frame could be modified to assist in locating the misconfigured network device and obtain information regarding the MAC device using the LLDP organizationally-specific TLV that could include a modified query or field as shown in FIG. 4A. As will also be described later, FIG. 5 is an example of a communications system that can incorporate various switches and devices that can use the methodology as described above in order to illustrate an example of the network that could benefit from this methodology.

It should also be understood that the network can use link bonding, which is also referred to as Ethernet bonding, channel bonding, or network bonding by those skilled in the art. This technology allows two or more transmission channels, such as communication subscriber line pairs, for example, in an XDSL system to be combined at the symbol, bit, byte, frame or flow level for creating a virtual transmission channel having a higher bandwidth than a single transmission channel. The bonding across multiple communication line pairs also termed "links" provides any Ethernet over Copper (EoCu) devices the ability to create high bandwidth communications pipes with communication of Ethernet and similar data traffic. A bonded data link is also sometimes termed Ethernet in the First Mile (EFM) and typically treats the multiple copper lines as a unified physical layer. For example, the IEEE 802.3ah standard, the disclosure which is hereby incorporated by reference in its entirety, provides an ability to auto-detect which pairs are connected between two devices and are, therefore, eligible to be aggregated into a single Ethernet connection. Another example is the G.998.2 recommendation, for example, as applied with Single-pair High-speed Digital Subscriber Line (SHDSL) for Ethernet-based multi-pair bonding, the disclosure which is hereby incorporated by reference in its entirety.

It should be understood that various network elements shown in the high-level and fragmentary system 30 of FIG. 2 can include a bonding engine that receives a data string to be communicated to a customer premises (CP) and divides the data across subscriber lines from a network facility such as a central office facility to the customer premises. Similarly, a data stream to be communicated from a customer premises (CP) of the network can be received by the customer premises bonding engine, which transmits data across multiple subscriber lines. A network bonding engine receives such data and reassembles the data to form the original data stream received and divided by the customer premises (CP) bonding engine.

In a network facility such as a central office as a non-limiting example, subscriber lines can be terminated by circuitry residing on a "line card," typically as a printed circuit board as part of a rack mounted module. This can be as many as several thousand line cards at one facility. These line cards are typically held in slots of several chassis with each line card typically interfaced with the chassis backplane that enables the line card to communicate with various network devices and other equipment.

Different protocol may be used for communication between a central office and customer premises, for example, various digital subscriber line (DSL) protocols, such as asymmetric digital subscriber line (ADSL), ADSL 2, VDSL 2, high-bit rate digital subscriber line (HDSL), HDSL 2, HDSL 4, very-high-data-rate digital subscriber line (VDSL), and other protocols.

It should be understood that the communications network could include the central office and connect to a network such as a Public Switch Telephone Network (PSTN) or internet that routes data. The central office operates as a network facility and receives network data destined for equipment or other devices at customer premises. Typically, a central office in this example includes at least one telecommunications access module that includes at least one bonding engine and a transceiver and processor that could be separate or integral with a bonding engine. An access module is typically formed as a Physical Medium Entity (PME) and the bonding engine could use different configurations, including an ASIC, processor, or Field Programmable Gate Array (FPGA). A provisioning module would probably be included and a switch module switches data between access modules and a network. Typically, each data packet includes a header and data portion and control and routing information is included in the header and payload data is included in the data portion. Other examples of bonding technology are disclosed in commonly assigned U.S. patent application Ser. No. 12/836,695 filed Jul. 15, 2010, the disclosure which is hereby incorporated by reference in its entirety.

It should be understood that the discovery protocol frame as used in this non-limiting example can be part of a discovery protocol that comprises in one example a one-way neighbor discovery protocol such as the Link Layer Discovery Protocol (LLDP). A database such as a Management Information Base (MIB) in other devices 90, which could be neighboring or peer linked devices and include a MIB could be accessed such as using the Simple Network Management Protocol (SNMP) to obtain data regarding connectivity and MAC addresses. Typically in one example, the query of the discovery protocol frame is a user-defined field as a command that indicates information should be given by a network switch concerning any knowledge about stored MAC addresses. This discovery protocol frame can include an organizationally specific Type Length Value (TLV) and Organizationally Unique Identifier (OUI) and defined information string to define the query to determine the physical network connectivity data. This could include a MAC address.

There now follows a brief description of LLDP relative to its use in the communications network shown in FIG. 2 and in FIG. 5 and that can be used for purposes of understanding.

LLDP is a common protocol used to exchange information between network devices and switches. With LLDP, each network switch has visibility of its neighboring switches. Network devices, such as Ethernet devices and switches, advertise information about themselves and store information in local Management Information Base (MIB) databases and are associated with network devices and accessible via the Simple Network Management Protocol (SNMP). This information can be used to build a network topology map using a Network Management Station (NMS), such as associated with the network manager or other device connector to the Ethernet communications network.

LLDP is a technique used for Ethernet network devices, including switches, routers and wireless LAN access points and other network devices to advertise information about themselves to other nodes on the network and store information they discover using the MIB in one non-limiting example. The details that are shared include the network device capabilities, identification (such as the MAC address), and device configuration. LLDP is typically a one-way neighbor discovery protocol with periodic transmissions. The LLDP frames are typically constrained to a single length. The frames contain formatted Type Length Values (TLV's), which carry information regarding a globally unique system and port identification, time-to-live information for aging purposes, optional system capabilities and optional system names and descriptions and management addresses such as IPV4 and IPV6.

LLDP in one aspect is covered by the IEEE standard, 802.1AB Link Layer Discovery Protocol (LLDP), the disclosure which is hereby incorporated by reference in its entirety. LLDP is advantageous over network-management tools such as reading bridge tables from an SNMP bridge MIB in which algorithms decide for the bridge tables and map the port-to-MAC address entries. For example, if a network uses the spanning tree protocol, a switch at the bottom of a configuration has ports of a single segment or network device and each port of a root switch contains the sum total of the network devices below it in its bridge table. Bridge tables are not always accurate. LLDP is also advantageous over fractal matching.

With LLDP, each network device on each port stores information defining itself and sends updates to a connected neighbor, which then stores the information in standard SNMP MIB's. Thus, information gathered with LLDP is stored in a network device and is queried with SNMP techniques. Typically, the topology of an LLDP-enabled network is discovered by "crawling" the hosts and querying a database. This is time consuming as noted above. "Crawling" can obtain information regarding a system name and description, port name and description, VLAN name, IP management address, system capabilities such as switching and routing, the MAC/PHY information and other link aggregation information.

In one aspect, LLDP defines a set of common advertisement messages and a protocol for transmitting the advertisements and a method for storing information contained in the received advertisements. Typically, LLDP-capable network devices support device chassis ID and port ID advertisements and support system name, system description and system capabilities advertisements. Typically, LLDP information is transmitted periodically and stored for a finite period. One recommended transmission rate is about 30 seconds, but this can be adjustable. Usually, the information stored in the SNMP MIB is valid for a period of time defined by the LLDP "time to live" (TTL) value as contained within a received packet. One recommendation is a TTL value of about 120 seconds, but it can be set to a maximum value of about 65,000 seconds or a minimum value of 0 seconds. Typically, a network device receives an LLDP advertisement packet and stores the information within it and initializes a timer that will be compared to the TTL value. If the timer reaches the TTL value, the network device deletes the stored information, and thus, ensures that only valid LLDP information is available to the network manager as part of any Network Management Systems. It should be understood that LLDP frames typically are not forwarded, but constrained to a single link and contain formatted TLV's as type length values that carry the globally unique system and port identification, time-to-live information for aging purposes, optional system capabilities such as the router, IP phone, and wireless AP and optional system name and description, management addresses and organizational extensions.

Typically, each LLDP-enabled network device contains one or several LLDP agents such as an LLDP state machine that controls the transmission and receipt of frames and state machine control variables. The local MIB holds the locally configured data that could be supplied or modified by management applications of a management system. Remote MIB's hold and age data as received.

Usually the LLDP frame contains an LLDP multicast address that is about six bytes as a destination address and a MAC address of about six bytes and an LLDP ether type of about two bytes and the LLDPU that is data plus padding and the FCS. An LLDPU field contains the TLV's as a chassis ID, port ID, TTL and similar information. As noted before, in operation, a Link Layer Discovery Protocol (LLDP) frame can be modified to assist in efficiently in determining the MAC address and any physical network connectivity data of the misconfigured device such as the device 32 shown in FIG. 2 and locate it to establish communication with the remote console terminal 46.

In one example, a user-defined field can be added into the LLDP frame. This user-defined field is a command that indicates that information should be given about stored MAC addresses and other information.

Figure 3A:
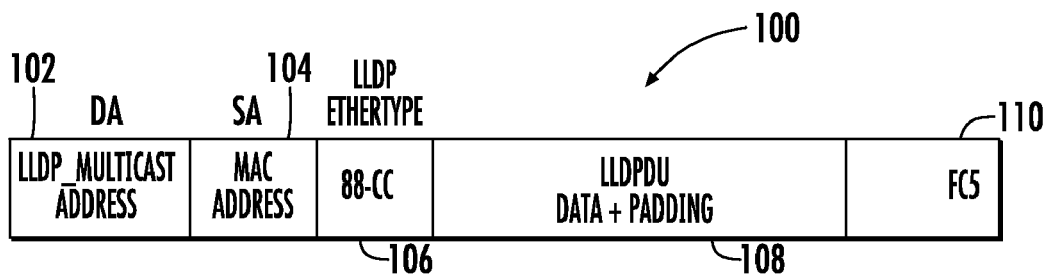
FIGS. 3A through 3C show respectively a Link Layer Discovery Protocol (LLDP) frame format, an LLDPU frame format, and TLV format that can be used in accordance with non-limiting examples and could be modified to locate and configure the network device that has been misconfigured.

FIG. 3A shows an IEEE 802.3 LLDP frame 100 that includes an LLDP multicast address 102 such as six bytes (octets) as a destination address and a MAC address 104 of about six bytes (octets) and an LLDP ethertype 106 of about two bytes (octets) and the LLDPDU 108 (Link Layer Discovery Protocol Data Unit) that is data plus padding and typically is about 1500 bytes (octets) and the FCS 110 as the frame control sequence of about four bytes (octets). The LLDPU field typically contains the TLV's as a chassis ID, port ID, TTL and similar items. In one non-limiting aspect, it is possible that the LLDP multicast address 102 equals 01-80-C2-00-00-0E that is the same as the STP except for the last octet. The information fields in each frame are contained in the LLDPU as the protocol data unit as a sequence of short, variable length, information elements known as TLV's that include the type, length and value fields and is modified for use with the system and method as described. The type identifies typically what kind of information is being sent. The length indicates the length of the information string in octets and the value is the actual information that needs to be sent.

Figure 3B:
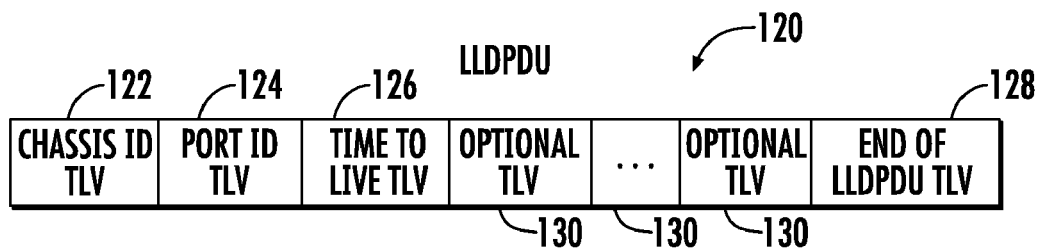

The LLDPU 120 format is shown in one non-limiting example in FIG. 3B. Mandatory TLV's that are required are illustrated. Mandatory TLV's include a chassis ID TLV 122, a port ID TLV 124, a time to live TLV 126, and an end of LLDPDU TLV 128. The optional TLV's 130 are illustrated.

Figure 3C:
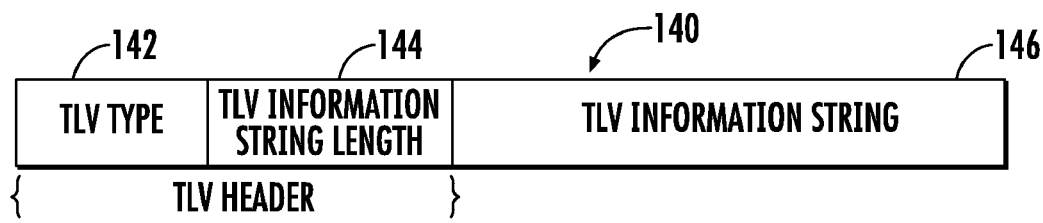

A frame for TLV format 140 is shown in FIG. 3C and shows the TLV type 142 of about seven (7) bits and the TLV information string length 144 of about nine (9) bits and the TLV information string 146 that is typically $0 \leq n \leq 511$ bytes (octets). The TLV type 142 and TLV information 144 form a TLV header 148. The chassis and port ID TLV's 122, 124 represent the connected system's chassis identification and the identification of the specific port that transmitted the LLDP frame. The receiving LLDP agent combines the chassis ID and port ID to represent an entity that sent the LLDPU. The time to live (TLV) represents for how long information contained in the received LLDPU should be valid. The end-of-LLDPU TLV marks the end of an LLDPDU. The TLV type field occupies the seven most significant bits of the first octet of the TLV format. The least significant bit in the first octet of the TLV format is the most significant bit of the TLV information string length field. Typically, the TLV type field identifies a specific TLV from the LLDP basic management set or particular set of TLV's.

Typically, an LLDP agent can advertise different TLV's. There could be a port description, system name, system description, system capabilities and management address TLV. A port description TLV identifies the port in which the LLDP agent transmitted the frame and the system name TLV represents the system's administratively assigned name. It describes a textural description of a network entity.

An example format for the modified frame is shown in FIGS. 4A and 4B. As noted before, the LLDP frame as known typically contains an LLDP multicast address, destination address, MAC address, LLDP ether type, LLDPU with data and padding and the FCS. The modified frame includes the query command in a new user defined field as a command that propagates through the network as necessary to request information about physical network connectivity and about a MAC address for the misconfigured network device in one example.

There now follows greater details regarding organizationally specific TLV extensions. These extensions can be defined by different organizations or vendors and concern implemented functionality within the network forming the communications system. The TLV structure of the LLDP allows a flexible protocol and permits advanced discovery options to be created. Vendors and companies and other organizations can define TLV's that advertise information to remote entities attached to the same media that typically are a one-way advertisement and usually independent from information from a remote port. Usually, the organizationally defined extension for the TLV set includes associated LLDP MIB extensions and associated TLV selection management variables and MIB/TLV cross-reference tables. The TLV type value of 127 as shown in FIG. 4A is used for organizationally defined TLV's. IEEE 802.1 TLV extensions can have different attributes with a Virtual Local Area Network (VLAN) such as a port VLAN ID TLV, port and protocol VLAN ID TLV, VLAN name TLV, and protocol identity TLV. The prot VLAN ID TLV allows a bridge port to advertise the port's VLAN identifier (PVID) that is associated with untagged or priority tagged frames. The port and protocol VLAN ID TLV allows a bridge to advertise whether it supports protocol VLAN's and what the protocols are associated. The VLAN name TLV allows a bridge to advertise the textural name of any VLAN with which it is configured. The protocol identity TLV allows a bridge to advertise particular protocols accessible through its port.

An 802.3 LAN interface can have TLV extensions such as the MAC/PHY configuration/status TLV and power via MDI TLV and length aggregation TLV and maximum frame size TLV. The MAC/PHY configuration/status TLV advertises a bit-rate and duplex capability of a node and current duplex and bit-rating of a sending node. It can advertise whether the settings were the result of auto-negotiation during link initiation or manual override. The power via MDI TLV advertises power-via-MDI capabilities. The length-aggregation TLV advertises whether the link is capable of being aggregated and whether it is currently in an aggregation, and if it is, the port of the aggregation. The maximum frame size TLV advertises the maximum supported 802.3 frame size of a sending port or station.

In accordance with a non-limiting example, an organizationally-specific TLV can be used, filling in the OUI (0x00 0xA0 0xCA) then populating the defined information string with the MAC address and action. An example is a frame that is sent from one network device and meant to be propagated to other devices via LLDP. The "action" may be for the receiving device or switch to obtain relevant data. The action could also be to reply to the originating network switch with information about the MAC address, i.e., what port it is connected to.

FIG. 4A shows there is an LLDP organizationally-specific TLV that can be defined so that an organization can extend the LLDP to fit their needs. The OUI (organizationally unique identifier) is included so that each organization can differentiate between their own special TLV's and the organization's TLV's. This special TLV can be used to aid in determining the MAC address of the misconfigured network device to locate and configure the device.

As shown in FIG. 4A, the TLV type equals 127 and is about seven bits in this example. The TLV information string length is about nine bits. The OUI is about three octets and the organizationally-defined subtype is about one octet. The organizationally-defined information string is about zero to about 507 octets. FIG. 4B shows a frame example for the MAC address TLV relative to the LLDP organizationally-specific TLV. The last grouping shows the action and can include additional information.

There now follows a general description of a larger IP network as a general description to show a more specific and larger network example to which the examples as described can be applied. FIG. 5 is a system diagram of a communications system 200 that includes various network components and devices as shown in FIG. 2 and other interconnected platforms, switches and platforms or servers. It should be understood that the system 200 shown in FIG. 5 is only one non-limiting example of a communications system that can be used with the methodology as described.

FIG. 5 shows the communications system that includes layer 2 and layer 3 network switching functionality. Typically, layer 2 switches can be provided such as the NetVanta 1200 and 1500 series switches 210 while layer 3 Ethernet switches can be provided, such as NetVanta 1300 series devices 220 as non-limiting examples, for example, the NetVanta 1335 and related series of devices. In FIG. 5, various devices such as a 1300 series devices by ADTRAN, INC. are illustrated and 1200 series devices by ADTRAN, INC. as layer 2 devices all show layer 2 and layer 3 switching and functionality in this non-limiting example. It should be understood that a Total Access multi-service access and aggregation platform (MSAP), e.g., Total Access 5000 from ADTRAN, INC. can be used in these examples with network modifications.

Switches and other network devices as illustrated in this example run the ADTRAN Operating System (AOS) and provide standards-based, non-blocking switching and support for virtual LAN's (VLAN's), Quality of Service (QOS), and Class of Service (COS) for applications such as VoIP, link aggregation, advanced management and remote configuration capability and other functions. The devices in some aspects are fully managed layer 2 and layer 3 fast Ethernet switches and include 802.3af Power over Ethernet (PoE) enabled capabilities in some examples. The quality-of-service capabilities support mission critical applications such as VoIP. A WiFi access controller manages a plurality of Wireless Access Points (WAP's) in another example. These Ethernet switches can support layer 2, 802.1p Class of Service (COS) and weighted round robin and strict priority queuing for traffic prioritization. At layer 3, a multi-service router supports various markings and class-based weighted-fair or low latency queuing.

As noted before, layer 2 switches can be stackable POE switches with gigabit uplinks. In one non-limiting example, a Wireless Access Point (WAP) uses a NetVanta 150 wireless access point (WAP) or NetVanta 1335 with WiFi that provides 802.11 a/b/g radio support and Virtual Access Points (VAP's) and segment wireless networks together. All-in-one switch-routers perform services such as switching, IP routing, firewall, Virtual Private Networking (VPN), and 802.11a/b/g WiFi in a single platform. A NetVanta 1335 series switch integrates a modular IP access router and 24-port PoE layer 3 switch, firewall, VP and appliance and wireless access in a platform. Layer 2 switch-routers can be all-in-one access platforms such as the NetVanta 1200 series switch-routers for a cost-effective, single box approach to Voice over IP (VoIP) migration. Layer 3 switching is provided in one example for VLAN trunking and GVRP for 802.1Q VLAN functionality and provide separation of broadcast domains and functional work areas.

Other communications servers could be used in the illustrated networks of FIG. 5 such as a NetVanta 7000 series servers and devices (including NetVanta 7100 devices) as manufactured by ADTRAN, INC. of Huntsville, Ala. The communication servers are an all-in-one, office-in-a-box that provides voice and data solutions, including Private Branch Exchange (PBX) functionality. SIP communications are used to various remote sites having communications servers such as IP business gateways in other examples.

Any communications servers could be formed as a single chassis and provide a LAN-to-WAN infrastructure and Quality of Service (QoS) that maintains voice quality and includes a Graphical User Interface (GUI) for network set-up and facilitate installation and system administration. In this example, a communications server allows a converged IP voice and data network with a full-function IP PBX for voice such as a NetVanta 7000 series. It includes an integrated Power Over Ethernet (POE) switch-router for data in an integrated device and a Virtual Private Network (VPN) for secure Internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules include T1 and ADSL Network Interface Modules (NIMs). Analog (FXS, FXO) Voice Interface Modules (VIMs) are included in another example with T1, PRI voice interface modules and fiber SFP modules.

A communications server, in one example, is an integrated communications platform and includes capability of a fast Ethernet switch with Gigabit uplinks and expansion slots for the network interface modules and voice interface modules. A IP telephone system as part of the communications network 200 as illustrated could include voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. Some devices can operate as an integral SIP gateway with the appropriate FXS and FXO analog interfaces to support analog phones, fax machines, modems and credit card readers. An integrated voice mail can include 3,000 or more messages on eight ports and multi-level auto-attendant that are multi-level on eight ports such as in the example of a NetVanta 7000 series device. These devices include, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

In one example, SIP networking is supported between multiple locations. A business can connect multiple sites and have three or four digit dialing and local call routing and survivability and on-net calls for toll bypass. Multiple SIP trunks allow a communications server to connect to other communication servers. Remote SIP trunks can be supported and connect to all endpoints at all locations such that a user can have local voice mail and auto-attendant services. A hub and spoke SIP network can be accomplished in another example. A dedicated communications server can aggregate SIP trunks at a central location, which for qualified applications, increases the number of other communication servers that can be networked together.

The user can use an Internet Protocol (IP) phone such as an IP 700 series of telephones with different line versions and support multiple call functions. It is possible to incorporate voice mail-to-email applications and personal auto-attendant in which each phone sets up their own automatic attendant. It is also possible for the communications server to ring a series of stations and one external phone number. A communications server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for a platform or communications server to work in a multi-vendor environment and with an integrated T1-PRI trunk to consolidate separate voice lines and internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications method, comprising:
locating and identifying an IP address configurable, Link Layer Discovery Protocol (LLDP) network device within an Ethernet communications network that has been misconfigured in its IP address by propagating over the Ethernet communications network to which the network device is connected a LLDP frame having an organizationally specific Type Length Value (TLV) and Organizationally Unique Identifier (OUI) and data defining a query as a command to request data of physical network connectivity and determining the Media Access Control (MAC) address of the network device;
connecting a remote console terminal and logging into the network device over the Ethernet communications network and communicating through the Ethernet communications network to the network device after discovering and identifying the network device;
communicating with the network device from the remote console terminal using Ethernet packets; and
configuring correctly the IP address of the network device.

2. The method according to claim 1, wherein the discovery protocol frame comprises a Link Layer Ethernet OAM message.

3. The method according to claim 1, and further comprising accessing at a network switch a Management Information Base (MIB) via the Simple Network Management Protocol (SNMP) to determine a MAC address and physical connectivity data for the network device that has been misconfigured in order to establish communications between the remote console terminal and network device.

4. The method according to claim 1, and further comprising transmitting Ethernet packets using a clear text protocol.

5. The method according to claim 1, and further comprising transmitting Ethernet packets using an encrypted protocol.

6. A communications method, comprising:
locating and identifying an IP address configurable, Link Layer Discovery Protocol (LLDP) network device within an Ethernet communications network that has been misconfigured in its IP address by propagating within the same broadcast domain of an Ethernet communications network to which the network device is connected LLDP frame having an organizationally specific Type Length Value (TLV) and Organizationally Unique Identifier (OUI) and data defining a query as a command to request data of physical network connectivity and determining the Media Access Control (MAC) address of the network device;
connecting a remote console terminal and logging into the network device over the Ethernet communications network and communicating through the Ethernet communications network to the network device after discovering and identifying the network device;
communicating with the network device from the remote console terminal using Ethernet packets; and
configuring correctly the IP address of the network device.

7. The method according to claim 6, wherein the discovery protocol frame comprises a Link Layer Ethernet OAM message.

8. The method according to claim 6, and further comprising accessing at a network switch a Management Information ease (MIB) via the Simple Network Management Protocol (SNMP) to determining a MAC address and physical connectivity data for the network device that has been misconfigured in order to establish communications between the remote console terminal and the network device.

9. The method according to claim 6, and further comprising transmitting Ethernet packets using a clear text protocol.

10. The method according to claim 6, and further comprising transmitting Ethernet packets using an encrypted protocol.

11. A communications system, comprising:
a plurality of IP address configurable, Link Layer Discovery Protocol (LLDP) enabled network devices forming an Ethernet communications network, one of said network devices having been misconfigured in its IP address; and
at least one network device configured to propagate over the Ethernet communications network a LLDP frame having an organizationally specific Type Length Value (TLV) and Organizationally Unique Identifier (OUI) and data defining a query as a command to request data of physical network connectivity and determine and identify the Media Access Control (MAC) address of the network device that has been misconfigured; and
a remote console terminal connected to the Ethernet communications network, which in response, communicates with the network device having the misconfigured IP address using Ethernet packets and configures correctly the network device.

12. The communications system according to claim 11, wherein said remote console terminal is configured to propagate the discovery protocol frame within the same broadcast domain of the Ethernet communications network.

13. The communications system according to claim 11, wherein said remote console terminal is configured to transmit Ethernet packets using a clear text protocol.

14. The communications system according to claim 11, wherein said remote console terminal is configured to transmit Ethernet packets using an encrypted protocol.

* * * * *

UNITED STATES PATENT AND TRADEMARK OFFICE
CERTIFICATE OF CORRECTION

PATENT NO. : 8,402,120 B1
APPLICATION NO. : 12/939200
DATED : March 19, 2013
INVENTOR(S) : David Perkinson Page 1 of 1

It is certified that error appears in the above-identified patent and that said Letters Patent is hereby corrected as shown below:

In the Claims

Claim 8, Column 14, Line 27 – delete "ease" and insert -- Base --, therefor.

Signed and Sealed this
Fifteenth Day of October, 2013

Teresa Stanek Rea
*Deputy Director of the United States Patent and Trademark Office*